INVENTOR.
JOSEPH W. HALINA
BY [signature]
ATTORNEY

Oct. 23, 1962 J. W. HALINA 3,060,383

GAIN REGULATION CIRCUIT

Filed Dec. 4, 1958 4 Sheets-Sheet 2

INVENTOR.
JOSEPH W. HALINA
BY [signature]
ATTORNEY

INVENTOR.
JOSEPH W. HALINA
BY Isidore Togut
ATTORNEY

INVENTOR.
JOSEPH W. HALINA
BY Isidore Togut
ATTORNEY

United States Patent Office 3,060,383
Patented Oct. 23, 1962

3,060,383
GAIN REGULATION CIRCUIT

Joseph W. Halina, San Francisco, Calif., assignor to International Telephone and Telegraph Corporation, Nutley, N.J., a corporation of Maryland Filed Dec. 4, 1958, Ser. No. 778,201
11 Claims. (Cl. 329—50)

Figures 1, 2, 3:
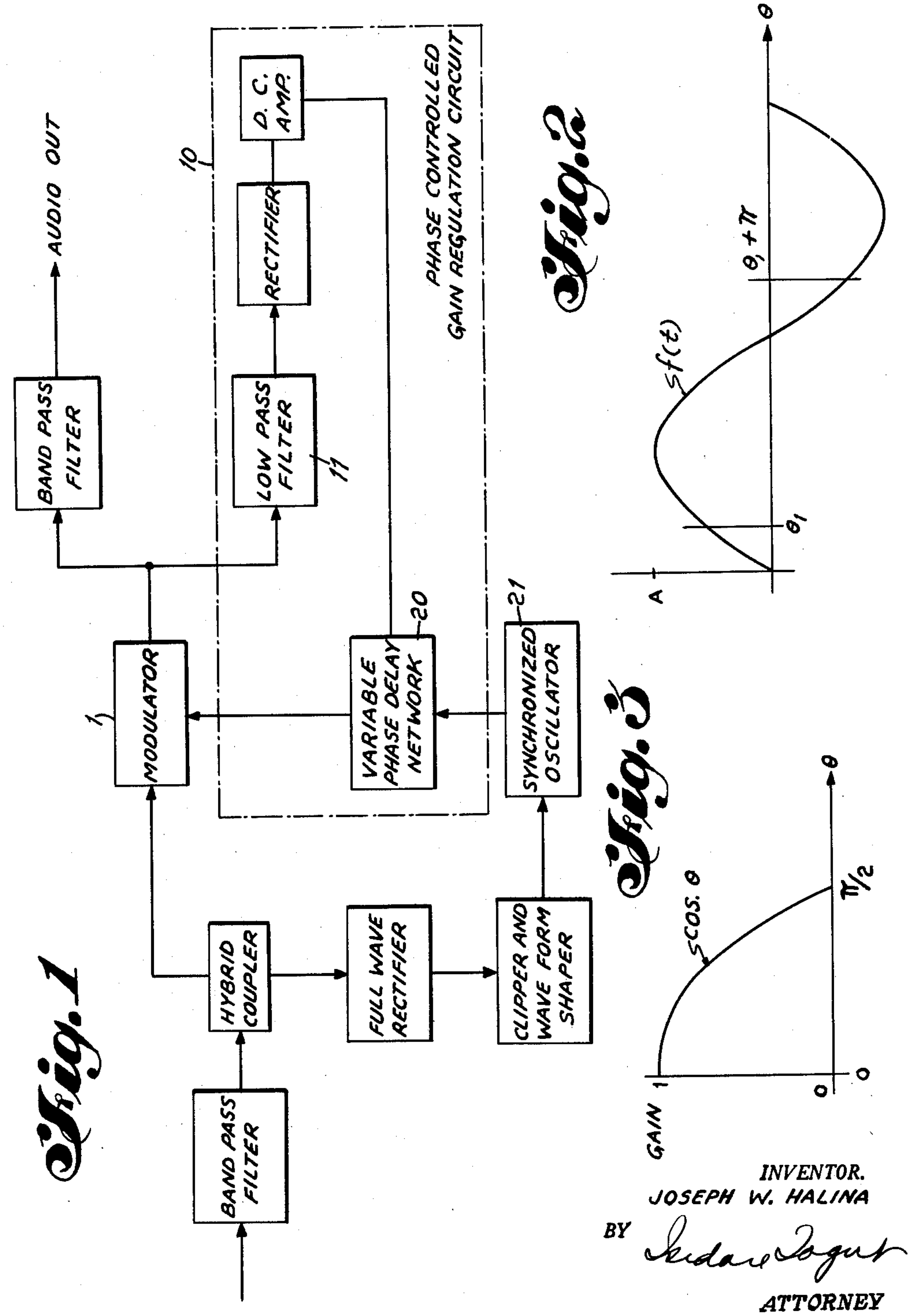

This invention relates to automatic gain control circuits and more particularly to phase controlled gain regulation.

In the copending application of J. W. Halina entitled, "Synchronous Demodulation System," Serial No. 702,987, filed December 16, 1957, there is disclosed a system for synchronously demodulating double sideband suppressed carrier signals which utilizes an oscillator synchronized to the frequency and phase of the suppressed carrier. In the prior art of single and double sideband suppressed carrier systems automatic gain control has been obtained from detection circuits such as diode or square law detectors. However, in these detection circuits wherein the logarithmic characteristics of diode or square law detectors are used, the distortion problems are severe with the usual means of securing automatic gain control.

It is therefore an object of this invention to provide an automatic gain control and regulation circuit compatible with the synchronous demodulation system referred to above or similar systems for double sideband suppressed carrier signals.

It is a further object to provide an automatic gain control and regulation circuit which relies on the phase control of the synchronized oscillator output signal in a synchronous demodulation system.

A feature of this invention is the provision of a gain control circuit for use in a synchronous demodulation system which includes a modulator and an oscillator generating a signal equal in frequency to the carrier portion of received radio frequency signals. Means are provided to derive from the detected radio frequency signals an error signal and means responsive to the error signal varies the phase of the oscillator output signal to maintain the amplitude of the detected signal output of the modulator at a desired level.

A further feature is the provision in a synchronous demodulation system and in the automatic gain control circuit to rectify the synchronous rectified output of the modulator, which is determined by the envelope of the signal information, and to derive from the rectified output, the rectified direct current component of the carrier portion of the received signals. Means are provided responsive to this direct current component to vary the phase of the oscillator output signal and thereby shift the switching wave of the modulator to vary the magnitude of the direct current component of the carrier in order to maintain the amplitude of the modulator output at a desired level.

Still another feature is the provision in the means to vary the phase of the oscillator output signal of a variable capacitive network coupled to an inductance, thereby providing a phase shifting network which is coupled to the output signal of the oscillator.

Another feature is the use of a transistor to obtain the variable capacitance by coupling the direct current component of the carrier signal to the base of the transistor thereby providing a bias therefor which when varied in accordance with the variations in the direct current component changes the output impedance of the transistor.

Figures 6, 7:
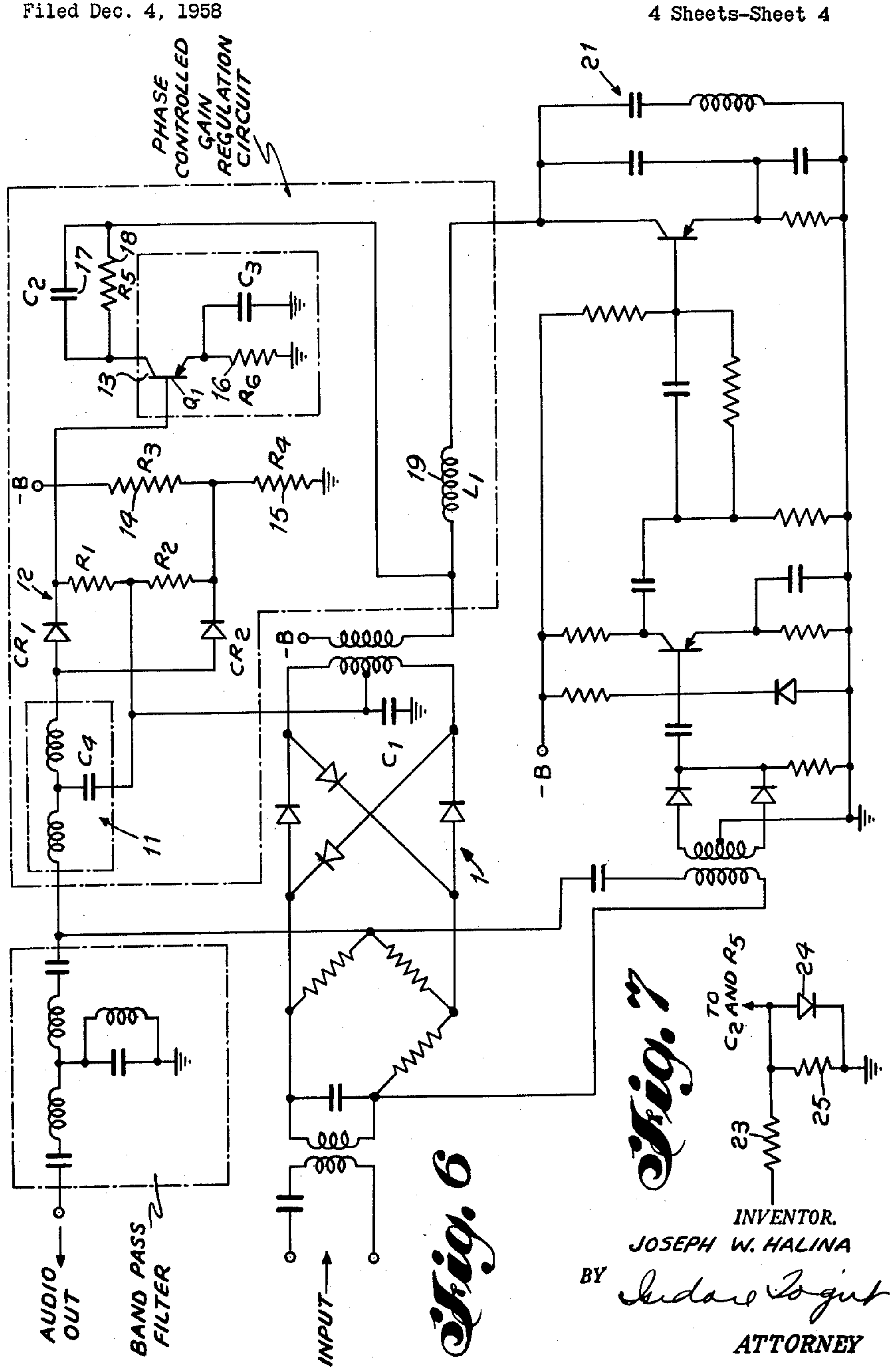

The above-mentioned and other features and objects of this invention will become more apparent by reference to the following description taken in conjunction with the accompanying drawings, in which:

FIG. 1 is a block diagram of a synchronous demodulation system including the phase controlled gain regulation of this invention;

FIGS. 2, 3, 4, and 5 are graphs and wave forms illustrating the theory of this invention;

FIG. 6 is a the circuit diagram of one embodiment of this invention in conjunction with the circuit of the synchronous demodulation receiver disclosed in the copending application; and FIG. 7 is another embodiment of this invention wherein a diode is used instead of the transistor of FIG. 6.

The theory underlying the phase controlled gain regulation of this invention can be best explained with reference to FIGS. 2, 3, 4, and 5. Consider a sine wave, as shown in FIG. 2, which is to be detected by means of a gate of relative angular duration $\pi$ and adjustable relative phase of $0<\theta<\pi/2$. In FIG. 2 the gate is taken to be of duration $\pi/2$. This results in maximum detection efficiency. However, for transmission considerations, such as immunity to noise, the gate may be of any duration in the range of 0 to $\pi/2$.

$$\text{Let } f(t)=\sin\theta$$

Examine now the wave form resulting from periodically gating $f(t)$ in the interval $\theta_1$ to $(\theta_1+\pi)$. The Fourier expansion for this resultant periodic waveform is $$f(\theta_n)=\frac{1}{2\pi}\int_{\theta_1}^{\theta_1+\pi} f(t)\,\epsilon^{-j\theta_n}d\theta$$

The first term of this expansion which may be called the fundamental is $$f(\theta_0)=\frac{1}{2\pi}\int_{\theta_1}^{\theta_1+\pi} f(t)\,d\theta$$

$$=\frac{A}{\pi}\cos\theta_1$$

If the magnitude of $f(\theta_0)$, or the fundamental versus $\theta_1$ is plotted, the gain regulation characteristic of FIG. 3 is obtained.

Figure 4:
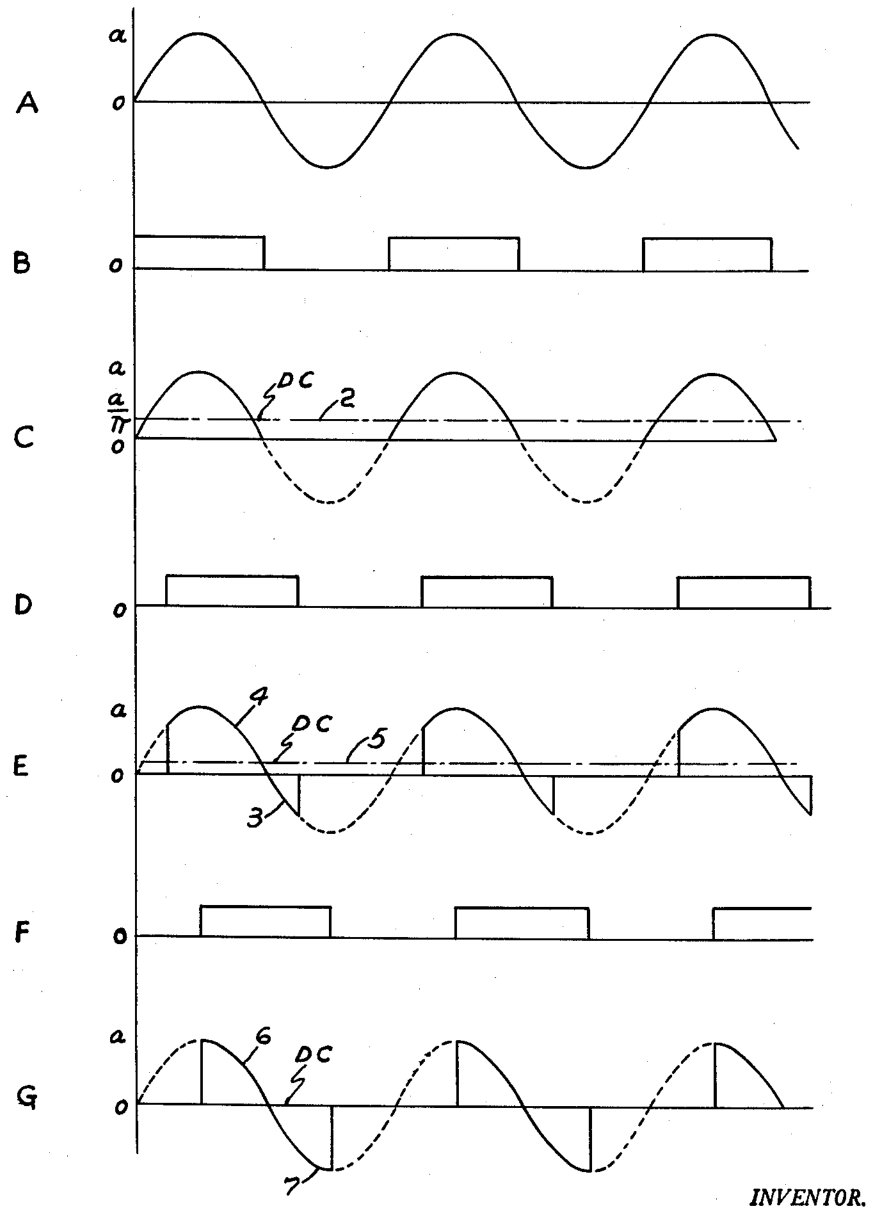
Figure 5:
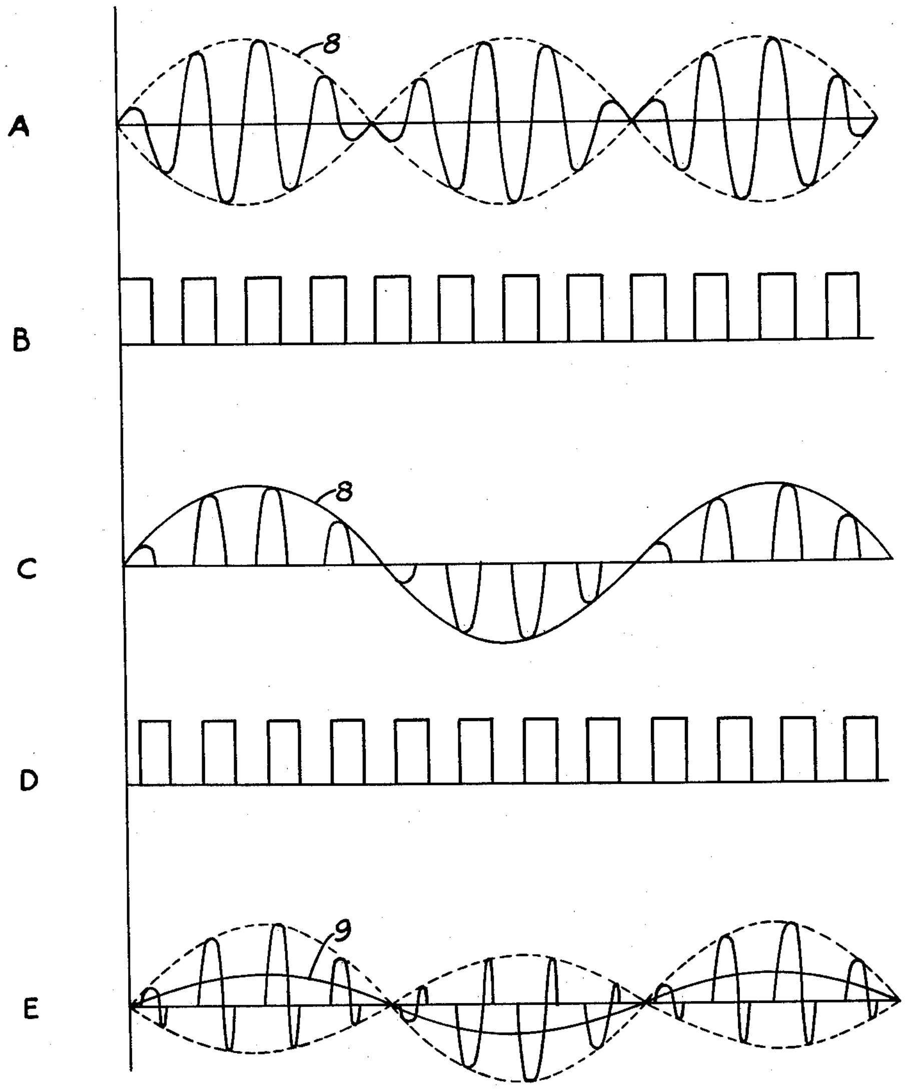

The effects of variable phase gating is shown in FIGS. 4 and 5. In FIG. 4 the variation in D.C. due to synchronously demodulating a constant carrier is shown in relation to varying phase relations of switching gate. Waveform A illustrates a typical sine wave input. B is a switching wave which is characteristic of the rectifier detection process of a bridge-type modulator 1, such as shown in FIG. 6, which is produced by the oscillator signal being in frequency and phase with the input signal and causing conduction through the modulator of half the cycle. In C there is shown the output wave of the modulator 1 with the broken line 2 representing the equivalent D.C. value of the wave when the carrier signal and oscillator signal are in frequency and phase synchronism. It is to be understood that the input wave may be any sine wave and in this particular case represents the carrier portion of the received signals. Waveform D shows the switching wave displaced to the right by a 45-degree shift in phase. Waveform E is the output wave of the modulator 1 into which is fed the oscillator signal of D, which now shows a negative portion 3 of the signal as well as a positive portion 4 passing through the modulator. The broken line 5 represents the equivalent D.C. value of the waveform E, which is less than the equivalent D.C. value 2 of the waveform C. In F the switching wave has been displaced 90 degrees. The output wave G of the modulator then shows equal positive and negative portions 6 and 7 and the D.C. equivalent value therefore is zero.

It follows that in a double sideband suppressed carrier communication system the emission of carrier corresponds to a detection of D.C. at the receiver. If the emitted carrier is maintained at any arbitrary amplitude but constant at that amplitude, the detected D.C. can then be used as a measure of received signal magnitude and/or the measure of phase synchronism of the local oscillator.

It should be noted that instead of the transmission of the carrier which, as explained above, corresponds to D.C. after detection, any frequency of tone could similarly be introduced at the transmitter end. For example, if the signal band were 300 to 3000 c.p.s., as it is for purposes of telephony, a tone above 300 cycles, e.g., 3500 c.p.s., could be applied for regulation purposes. At the receiver, the low pass filter would then be substituted by a 3500 c.p.s. band pass filter, with the remainder of the circuit unchanged. Thus, any frequency from D.C. to the limits of the transmission band can be used and appropriately filtered for control purposes.

In FIG. 5 a corresponding set of waveforms is shown for a received signal due to double sideband suppressed carrier transmission of a single tone. Waveform A of FIG. 5 shows an input signal of a characteristic double sideband suppressed carrier form. Waveform B in FIG. 5 shows the switching wave operative in the modulator which is equal in frequency and phase to the suppressed carrier and therefore produces the output wave and resultant detected signal shown in waveform C wherein 8 is the envelope of the signal information. In waveform D the switching wave has been displaced by 45 degrees and thereby results in the waveform E which is the output wave and resultant detected signal 9.

FIG. 1 is a block diagram of a synchronous modulation receiver described in the copending application but with gain control equipment added inside the box enclosed by a broken line. While the added gain control circuit 10 is shown in FIG. 1 as associated with the particular receiver of the copending patent application, its application is not confined to that specific receiver but is generally applicable to any synchronous detector system.

In FIG. 6 there is shown a schematic embodying the invention. The received signal is a combination of carrier emission modulated sideband information as described in conjunction with FIGS. 4 and 5. The D.C. due to the detection of the carrier is separated by a low pass filter 11. A rectifier 12 removes the 180-degree ambiguity inherent in the receiver. This ambiguity is due to the fact that the oscillator is synchronized in incremental phase but may be in error by 180 degrees, i.e., in polarity, as described in the copending patent application. As a consequence the magnitude of the received carrier is detected with fidelity, but the polarity can be positive or negative. The rectifier 12 following the low pass filter 11 converts the output of the low pass filter into an output of uniform negative polarity. A transistor 13 is used as a D.C. controlled variable capacitor. The D.C. output of the rectifier 12 is coupled to the base 13*a* of the transistor 13 to provide a bias therefor. It is well known that the capacitive component of the output impedance of a transistor is a function of the square root of the collector voltage. Resistors 14, 15 and 16 are used to adjust the transistor to the desired operating point. A capacitor 17 bypasses resistor 18. The transistor output capacity in conjunction with an inductance 19 forms a variable phase network 20 through which the output of a local oscillator 21 is applied to the modulator 1.

Initially the phase of the local oscillator 21 output in relation to the received carrier is set at some point $\theta$ such that $0<\theta<\pi/2$, assume $\pi/4$. If the output level from the modulator 1 drops, the D.C. output of the rectifier 12 fed to transistor 13 is reduced and so is the effective output capacity of transistor 13. As a result the phase delay, suffered by the local oscillator 21 output signal in transmission through the inductance 19 to which is coupled the equivalent capacity of transistor 13, is reduced, and the amplitude of the modulator 1 output increased to compensate for the initial loss. Correspondingly an increase of signal strength initiates a reverse sequence of events and regulation is a gain accomplished. It should be noted that the source of control D.C. could have been obtained by other means, e.g., the rectification of some reference tone.

It is to be understood that a variable phase delay network consisting of circuit elements other than a transistor and an inductance may be used equally well.

In FIG. 7 is shown another embodiment of this invention using a silicon diode instead of a transistor. The circuitry shown within the box 22 may be replaced by the circuitry of FIG. 7 with the remainder of the circuitry unchanged. The output of the low pass filter 11 is coupled by means of the resistor 23 to a silicon diode 24 which is by-passed to ground by the resistor 25.

The circuit of this invention has been reduced to practice, as shown by the schematic diagram of FIG. 6 in a system where the suppressed carrier frequency is 96 kc. Typical parameters used in this circuit are as follows:

*Capacitors*

| | μfds. |
|---|---|
| $C_1$ | 4 |
| $C_2$ | .01 |
| $C_3$ | 1.0 |

*Diodes*

| | |
|---|---|
| $CR_1$, $CR_2$ | IN91 |

*Inductance*

| | Millihenries |
|---|---|
| $L_1$ | 3 |

*Resistors*

| | K ohms |
|---|---|
| $R_1$ | 2.4 |
| $R_2$ | 2.4 |
| $R_3$ | 30 |
| $R_4$ | 2.4 |
| $R_5$ | 30 |
| $R_6$ | 2.4 |

*Transistors*

| | |
|---|---|
| $Q_1$ | Germanium PNP alloy junction triode |

While I have described above the principles of my invention in connection with specific apparatus, it is to be clearly understood that this description is made only by way of example and not as a limitation to the scope of my invention as set forth in the objects thereof and in the accompanying claims.

I claim:

1. An automatic gain control circuit for use in a communication system having means to synchronously detect radio frequency signals including a modulator and an oscillator generating a signal equal in frequency to the carrier portion of said radio frequency signals, comprising means to derive from said detected radio frequency signals an error signal, and means coupling the output of said oscillator to said modulator and responsive to said error signal to vary the phase of said oscillator output signal and thereby maintain the amplitude of the detected signal output of said modulator at a desired level.

2. An automatic gain control circuit for use in a communication system having means to synchronously detect radio frequency signals including a modulator and an oscillator generating a signal equal in frequency to the carrier portion of said radio frequency signals comprising means to derive from said carrier portion a direct current voltage, and means coupling said direct current voltage to the output of said oscillator to vary the phase of said oscillator output signal and coupling said phase controlled oscillator output signal to said modulator to thereby maintain the amplitude of the detected signal output of said modulator at a desired level.

3. An automatic gain control circuit according to claim 2 wherein said means to derive said direct current voltage comprises a low-pass filter, means coupling the output of said modulator to said low-pass filter, a rectifier, and means coupling the output of said low-pass filter to said rectifier to derive as the output of said rectifier said direct current voltage.

4. An automatic gain control circuit according to claim 3 wherein said means to vary the phase of said oscillator output signal comprises a variable capacitance and an inductance coupled thereto, means coupling said direct current voltage output of said rectifier to said variable capacitance, and means coupling the output of said variable capacitance and said inductance to said oscillator output signal.

5. An automatic gain control circuit according to claim 4 wherein said variable capacitance comprises a transistor and said direct current voltage controls the capacitance component of the output impedance of said transistor.

6. An automatic gain control circuit for use in a communication system having means to synchronously detect radio frequency signals and derive the signal information therein including a modulator having a synchronous rectified output determined by the envelope of said signal information and an oscillator generating a signal equal in frequency to the carrier portion of said radio frequency signals, comprising means to derive from said detected radio frequency signals the rectified direct current component of said carrier, and means coupled to the output of said oscillator and responsive to said direct current component to vary the phase of said oscillator output signal and coupling said phase controlled oscillator output signal to said modulator to thereby shift the switching wave of said modulator and vary the magnitude of said direct current component in order to maintain the amplitude of said modulator output at a desired level.

7. An automatic gain control circuit according to claim 6 wherein said means responsive to said direct current component comprises a variable capacitive network, an inductance, and means coupling the output of said variable capacitance to said inductance and to said oscillator output signal to introduce thereby in said oscillator output signal a phase shift in accordance with the deviation of said direct current component from the desired magnitude thereof that corresponds to said desired level of said modulator output.

8. An automatic gain control circuit according to claim 7 wherein said means to derive the rectified direct current component of said carrier comprises a rectifier, a low-pass filter coupling the output of said modulator to the input of said rectifier to derive from the output thereof the negative direct current component of said rectified carrier.

9. An automatic gain control circuit according to claim 8 wherein said variable capacitance means comprises a transistor together with an associated resistor-capacitor network and said negative direct current output of said rectifier is applied to the base of said transistor.

10. An automatic gain control circuit according to claim 9 wherein the output signal of said transistor is coupled to said inductance and the impedance of said output varies in accordance with the change in bias on said transistor imposed by the varying negative direct current output of said rectifier.

11. An automatic gain control circuit according to claim 8 wherein said variable capacitance means comprises a diode together with an associated resistor-capacitor network and the output of said rectifier is coupled to said diode.

References Cited in the file of this patent

UNITED STATES PATENTS

| | | |
|---|---|---|
| 2,231,704 | Curtis | Feb. 11, 1941 |
| 2,844,795 | Herring | July 22, 1958 |
| 2,884,518 | O'Neill | Apr. 28, 1959 |
| 2,911,528 | McRae | Nov. 3, 1959 |
| 2,938,114 | Krause | May 24, 1960 |
| 2,943,193 | Webb | June 28, 1960 |

FOREIGN PATENTS

| | | |
|---|---|---|
| 415,060 | Great Britain | Aug. 15, 1934 |

OTHER REFERENCES

Wireless World; "Junction Diode A.F.C. Circuit" (Johnstone), August 1956; pgs. 354 and 355.